(12) United States Patent  (10) Patent No.: US 8,139,158 B2
Onomatsu  (45) Date of Patent: Mar. 20, 2012

(54) TELEVISION BROADCAST SIGNAL RECEIVING APPARATUS

(75) Inventor: Takehiro Onomatsu, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1187 days.

(21) Appl. No.: 11/730,137

(22) Filed: Mar. 29, 2007

(65) Prior Publication Data

US 2007/0236612 A1  Oct. 11, 2007

(30) Foreign Application Priority Data

Apr. 5, 2006 (JP) .................. 2006-103941

(51) Int. Cl.
H04N 5/50 (2006.01)
(52) U.S. Cl. ............... 348/731; 348/570; 348/725
(58) Field of Classification Search .............. 348/731, 348/725–726, 553–555, 570; H04N 5/50
See application file for complete search history.

(56) References Cited

U.S. PATENT DOCUMENTS

| | | | | |
|---|---|---|---|---|
| 4,602,220 A | * | 7/1986 | Kurihara | 331/19 |
| 5,436,675 A | * | 7/1995 | Hayashi et al. | 725/72 |
| 6,286,142 B1 | * | 9/2001 | Ehreth | 725/78 |
| 7,015,981 B2 | * | 3/2006 | Kudo | 348/723 |
| RE41,540 E | * | 8/2010 | Tait | 455/277.1 |

FOREIGN PATENT DOCUMENTS

| | | |
|---|---|---|
| JP | 08-097683 A | 4/1996 |
| JP | 3070655 U | 5/2000 |
| JP | 2003-273759 A | 9/2003 |
| JP | 2004-363806 A | 12/2004 |
| JP | 2005-45592 A | 2/2005 |
| JP | 2005-159810 A | 6/2005 |
| JP | 2006-42181 A | 2/2006 |
| JP | 2006-60676 A | 3/2006 |

OTHER PUBLICATIONS

Japanese Office Action dated Nov. 29, 2011 including English-language translation (Eight (8) pages).

* cited by examiner

Primary Examiner — Trang U Tran
(74) Attorney, Agent, or Firm — Crowell & Moring LLP (57) ABSTRACT

Disclosed is a television broadcast signal receiving apparatus including: a selection section to select any one of the first antenna and the second antenna according to a frequency; a detection section to detect a reception level; a channel setting section to set a channel as a receivable channel when the reception level of a broadcast signal at the channel is a predetermined level or more; a control section; and an operation section, wherein the channel setting section includes: a frequency band setting section, wherein the frequency band setting section sets the frequency band of the broadcast signal within the channel is set, and the control section allows the selection section to select the first antenna for the broadcast signal of the first frequency band and to select the second antenna for the broadcast signal of the second frequency band, based on the set frequency band.

6 Claims, 6 Drawing Sheets

TELEVISION BROADCAST SIGNAL RECEIVING APPARATUS

BACKGROUND OF THE INVENTION

1. Field of the Invention

The present invention relates to a television broadcast signal receiving apparatus capable of receiving television broadcast signals of the UHF band and the VHF band, and more particularly to a television broadcast signal receiving apparatus having a channel auto scan (channel auto setting) function using a multidirectional antenna.

2. Description of Related Art

Because plain areas are dotted with large cities and are provided with many broadcasting stations in the North American Continent where the ATSC digital television broadcast (hereinafter abbreviated as TV broadcast) is performed, TV broadcast signals are transmitted from various directions. In such an environment, a viewer receiving the TV broadcast signals is required to adjust the reception direction of an antenna into the direction of the broadcasting station broadcasting the program that the viewer wants to watch. Accordingly, a multidirectional antenna such as a smart antenna has been put to practical use.

Moreover, the EIA-909 standard defines the smart antenna to have a reception direction in each direction obtained by dividing a circle into 16 directions. On the other hand, a digital TV broadcast signal receiving apparatus in conformity with the EIA-909 standard is configured to be capable of controlling reception directions into all of the 16 directions receivable with the smart antenna.

On the other hand, in order to receive a broadcast signal from each broadcasting station in a television broadcast signal receiving apparatus, it is necessary to execute the processing called channel auto scan (channel preset). It is desirable for a viewer to complete the channel auto scan processing in a time as short as possible.

For example, as the technologies concerning the channel auto scan or the channel preset, the inventions described in Japanese Utility Model Registration No. 3070655, Japanese Patent Application Publication Laid-open No. 08-097683 (Japanese Patent No. 3166810), Japanese Patent Application Publication Laid-open No. 2003-273759, Japanese Patent Application Publication Laid-open No. 2005-159810 and Japanese Patent Application Publication Laid-open No. 2005-045592 were proposed.

Now, the digitalization of terrestrial broadcasting has rapidly advanced in recent years in each country of the world. Although the digital terrestrial broadcasting is broadcasted in parallel to the existing UHF analog broadcasts, each of the assigned channel frequencies can simultaneously transmit five to six programs. The digital terrestrial broadcasting consequently has an advantage capable of settling a frequency tightness problem by using vacant frequencies in various fields. Moreover, it is determined that the analog terrestrial broadcasting will be abolished and completely veer to digital terrestrial broadcasting in several years, and the broadcasts using the VHF band will be reduced to be stopped in future together with the abolishment of the analog terrestrial broadcasting.

Under such a situation, because channels that are not received (vacant channels) becomes many, the use of the technologies disclosed in the above prior applications in the setting of a channel corresponding to a broadcast signal of the VHF band would cost a superfluously waste time. That is, if the presetting of a channel using the technologies of the above prior applications is executed, scanning is similarly performed to the TV broadcast signals even if the signals is of either of the VHF band and the UHF band. Consequently, it is conceivable that there is further room for improvement.

SUMMARY OF THE INVENTION

Accordingly, it is an object of the present invention to provide a television broadcast signal receiving apparatus capable of shortening an auto scan processing time by enabling a viewer to set a scan range in the channel auto scan processing of a television broadcast signal receiving apparatus.

In order to accomplish the above object, in accordance with the invention, a television broadcast signal receiving apparatus connected to an antenna apparatus including a first antenna capable of receiving broadcast signals of a first frequency band from many directions, and a second antenna capable of receiving a broadcast signal of a second frequency band from single direction, the television broadcast signal receiving apparatus comprising: a selection section to select any one of the first antenna and the second antenna according to a frequency of a broadcast signal to be received; a detection section to detect a reception level of a reception signal received by the first antenna or the second antenna; a channel setting section to set a channel as a receivable channel when the reception level of a broadcast signal at the channel is a predetermined level or more, the reception level detected by the detection section; a control section to control operations of the selection section, the detection section and the channel setting section; and an operation section to enable a viewer to input an operation, wherein the channel setting section includes: a frequency band setting section to set a frequency band of a broadcast signal within the channel is set, the frequency band setting section sets the frequency band of the broadcast signal within the channel is set, based on an input signal from the operation section, and the control section allows the selection section to select the first antenna for the broadcast signal of the first frequency band and to select the second antenna for the broadcast signal of the second frequency band, based on the frequency band set by the frequency band setting section.

Specifically, the first frequency band corresponds to a UHF band, and the second frequency band corresponds to a VHF band.

Moreover, the frequency band setting section allows a selection of whether or not to set the channel in the broadcast signal of the second frequency band. That is, the present aspect of the present invention allows a viewer to select either of performing a channel auto scan of a VHF band broadcast signal and not performing the channel auto scan thereof.

Here, the frequency band setting section allows a selection of whether or not to set the channel in the broadcast signal of the second frequency band, after the channel setting section sets the channel in the broadcast signals of the first frequency band.

Moreover, the frequency band setting section can set either or both of the first frequency band and the second frequency band. That is, the present aspect of the present invention allows a viewer to select any one of setting the frequency band at which a channel auto scan is performed to the UHF band, the VHF band, and both of the UHF band and the VHF band.

Moreover, the first antenna is a multidirectional antenna capable of switching a reception direction, and the second antenna is a unidirectional antenna capable of receiving the broadcast signal from a single direction; the channel setting section includes: a reception direction switch section to switch the reception direction of the first antenna; and a reception direction setting section to set a reception direction in which a reception state is optimum based on the reception levels in a plurality of reception directions detected by the detection section when the reception direction switch section sequentially changes the reception directions of the first antenna, wherein the control section allows the selection section to select the first antenna for the broadcast signal of the first frequency band and allows the channel setting section to set the channels and the reception directions of the broadcast signals of the first frequency band, and allows the selection section to select the second antenna for the broadcast signal of the second frequency band and allows the channel setting section to set the channel of the broadcast signal of the second frequency band.

By adopting the channel auto scan processing using the smart antenna like this, the auto scan can be executed still more efficiently. Incidentally, the unidirectional antenna is preferably configured to be capable of manually changing the directivity thereof.

According to the present invention, the television broadcast signal receiving apparatus connected to an antenna apparatus including a first antenna capable of receiving broadcast signals of a first frequency band from many directions, and a second antenna capable of receiving a broadcast signal of a second frequency band from single direction, the television broadcast signal receiving apparatus includes: a selection section to select any one of the first antenna and the second antenna according to a frequency of a broadcast signal to be received; a detection section to detect a reception level of a reception signal received by the first antenna or the second antenna; a channel setting section to set a channel as a receivable channel when the reception level of the broadcast signal at the channel is a predetermined level or more, the reception level detected by the detection section; a control section to control operations of the selection section, the detection section and the channel setting section; and an operation section to enable a viewer to input an operation, wherein the channel setting section includes: a frequency band setting section to set a frequency band of a broadcast signal within the channel is set, the frequency band setting section sets the frequency band of the broadcast signal within the channel is set, based on an input signal from the operation section, and the control section allows the selection section to select the first antenna for the broadcast signal of the first frequency band and to select the second antenna for the broadcast signal of the second frequency band, based on the frequency band set by the frequency band setting section. Consequently, the viewer can arbitrarily set the frequency band in which the channel auto scan processing is executed.

Hence, it is possible to set not to execute the channel auto scan of the broadcast signals of the VHF band if the broadcast signal of the VHF band has reduced as the television broadcast has been digitalized, and consequently the time of the auto scan can be remarkably shortened.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

DETAILED DESCRIPTION OF THE PREFERRED EMBODIMENTS

In the following, the preferred embodiments of the present invention are described with reference to the attached drawings. Incidentally, the scope of the invention is not limited to the shown examples.

Figure 1:
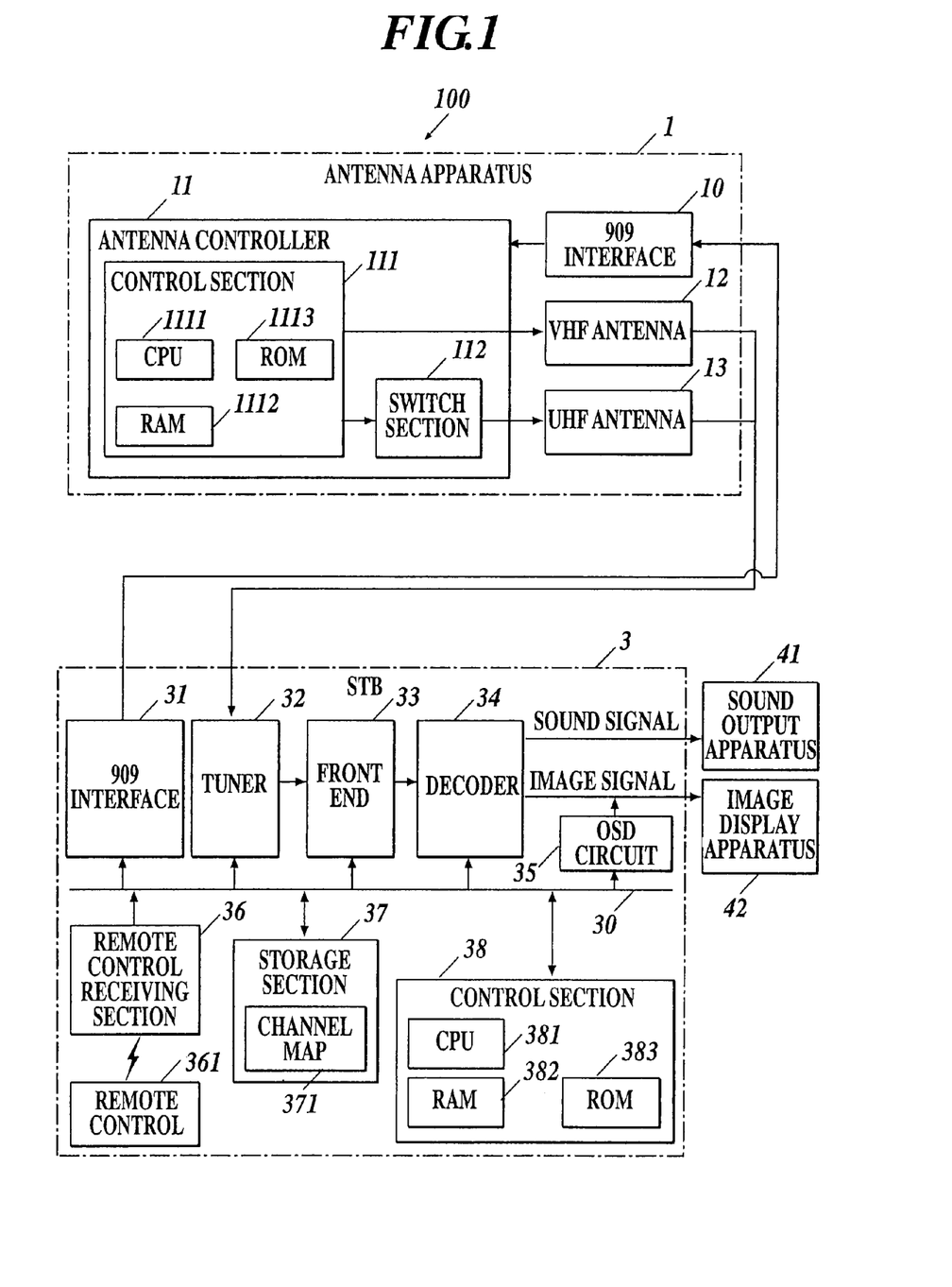
FIG. 1 is a block diagram showing the functional configuration of a television broadcast signal receiving system according to the present embodiment.
Figure 2:
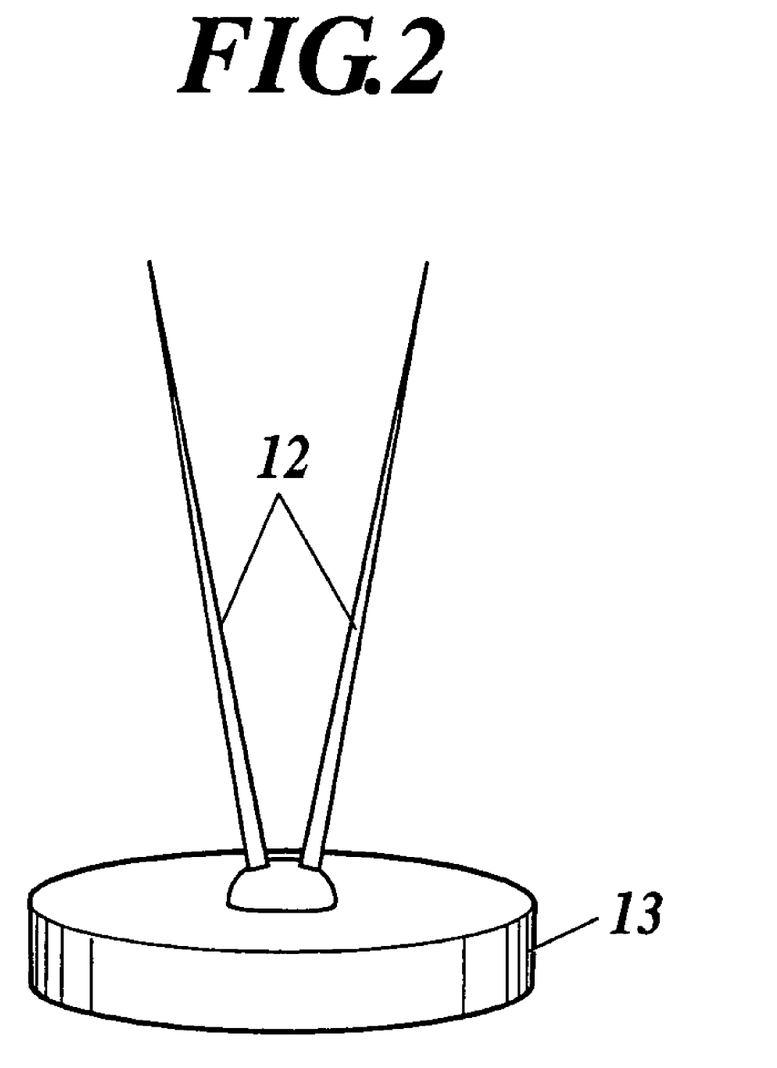
FIG. 2 is a perspective view showing the external appearance of an antenna apparatus 1 according to the present embodiment.

FIG. 1 is a block diagram showing the functional configuration of a television broadcast signal receiving system, and FIG. 2 is a perspective view showing the external appearance of the antenna apparatus 1.

A television broadcast signal receiving system 100 according to the present embodiment is configured to include the antenna apparatus 1 capable of receiving broadcast signals from a plurality of directions, and a set top box (hereinafter abbreviated to STB) as a television broadcast signal receiving apparatus connected to the antenna apparatus 1.

The antenna apparatus 1 is controlled by, for example, the STB 3 in accordance with a predetermined standard (such as the EIA/CEA-909).

The STB 3, for example, controls the antenna apparatus 1 in accordance with a predetermined standard (such as the EIA/CEA-909 or the like), and receives a television broadcast signal (hereinafter referred to as a "TV broadcast signal") through the antenna apparatus 1. Moreover, the STB 3 outputs a sound and an image based on a received TV broadcast signal.

In the present embodiment, the antenna apparatus 1 and the STB 3 are in conformity with the EIA/CEA-909 standard, as an example, and the interface for performing the communication between the antenna apparatus 1 and the STB 3 is called 909 interface.

The antenna apparatus 1, for example, is configured to include a 909 interface 10, an antenna controller 11, a UHF antenna 13 as a first antenna (multidirectional antenna) capable of a switch of directivity at the time of the reception of a TV broadcast signal in a first frequency band (for example, a UHF signal), and a VHF antenna 12 as a second antenna (unidirectional antenna) the directivity of which is fixed at the time of the reception of a TV broadcast signal in a second frequency band (for example, a VHF signal). The VHF antenna 12 and the UHF antenna 13 are, for example, coupled with each other in the state of being freely attachable and detachable as shown in FIG. 2.

The VHF antenna 12 is, for example, the antenna configured to be capable of receiving the VHF signal transmitted from a transmitting tower of a broadcasting station or the like. To put it concretely, the VHF antenna 12 is the so-called rabbit antenna, and is attached to the UHF antenna 13 in the state of being freely attachable and detachable.

The UHF antenna 13 is, for example, an antenna configured to be capable of receiving the UHF signal transmitted from a transmitting tower of a broadcasting station or the like. To put it concretely, the UHF antenna 13 is the so-called smart antenna (Yagi type antenna), and the directivity thereof can be adjusted into a plurality of directions (for example, 16 directions).

The VHF antenna 12 and the UHF antenna 13 are connected to a tuner 32 of the STB 3. When the VHF antenna 12 and the UHF antenna 13 receives a TV broadcast signal, the VHF antenna 12 and the UHF antenna 13 perform gain control processing such as the amplification of the TV broadcast signal by a predetermined gain, and output the TV broadcast signal (to put it concretely, a radio frequency (RF) signal) to the tuner 32.

The 909 interface 10 is, for example, connected with a 909 interface 31 (described below) of the STB 3, and performs the communication with the 909 interface 31 (described below) of the STB 3 based on a predetermined standard (for example, the EIA/CEA-909 or the like). The 909 interface 10 then receives channel information (described below) and the like for controlling the antenna apparatus 1 from the STB 3 to output the received information and the like to the antenna controller 11.

The antenna controller 11 is, for example, provided with a control section 111 and a switch section 112. Moreover, the control section 111 is, for example, provided with a central processing unit (CPU) 1111, a random access memory (RAM) 1112 and a read only memory (ROM) 1113.

The CPU 1111 performs various control operations in accordance with various processing programs for the antenna controller 11, which programs are stored in the ROM 1113. The RAM 1112 includes a program expansion region for expanding processing programs executed by the CPU 1111 and the like, a data storage region for storing input data, processing results produced at the time of the execution of the processing programs mentioned above, and the like. The ROM 1113 stores a system program executable in the antenna controller 11, various processing programs executable on the system program, data used at the time of the execution of these various processing programs, data of processing results arithmetically processed by the CPU 1111, and the like. Incidentally, the programs are stored in the ROM 1113 in the form of program codes readable by a computer. For example, the ROM 1113 stores an obtainment program, a judgment program, a selection program and the like.

The CPU 1111, for example, obtains the channel information transmitted from the 909 interface 31 of the STB 3 by executing the obtainment program stored in the ROM 1113. The channel information here means, for example, the information corresponding to the channel (virtual channel) tuned by a user. To put it concretely, the channel information includes a physical channel number for judging which of the VHF signal and the UHF signal a TV broadcast signal corresponding to a tuned channel, direction information pertaining to the direction of the directivity of an antenna, and gain information pertaining to the gain of the antenna.

Moreover, the CPU 1111 judges which of the VHF signal and the UHF signal a TV broadcast signal corresponding to the channel tuned by the user by executing the judgment program. To put it concretely, the CPU 1111 judges that a TV broadcast signal is the VHF signal when a physical channel number $\alpha$ is a predetermined value (for example, $\alpha=17$) or less, and judges that a TV broadcast signal is the UHF signal when the physical channel number $\alpha$ is larger than the predetermined value. The physical channel number is, for example, a number given so as to correspond to the frequency value of the frequency band in which the TV broadcast signal exist here, and the TV broadcast signal having a larger physical channel number exists in a frequency band having a larger frequency value. Moreover, the UHF signals exist in frequency band having larger frequency values in comparison with those of the frequency bans in which the VHF signals exist. It can be consequently judged by a physical channel number which of the VHF signal and the UHF signal a TV broadcast signal is.

Furthermore, the CPU 1111 selects either of the VHF antenna 12 and the UHF antenna 13 according to the frequency band (physical channel number) to which the TV broadcast signal corresponding to the tuned channel belongs by executing the selection program, and the CPU 1111 allows the selected antenna 12 or 13 to receive the TV broadcast signal. That is, if a user tunes a channel corresponding to the VHF signal, the CPU 1111 selects the VHF antenna 12 to receive the TV broadcast signal, and if the user tunes the channel corresponding to the UHF signal, the CPU 1111 selects the UHF antenna 13 to receive the TV broadcast signal.

If the UHF antenna 13 is, for example, selected as the reception antenna in accordance with a control signal input from the control section 111, the switch section 112 switches the directivity of the UHF antenna 13 based on the direction information.

Incidentally, the VHF antenna 12 is simply configured to have the reception sensitivity for the VHF band, and is not unable to receive the UHF signals. Similarly, the UHF antenna 13 is simply configured to have the reception sensitivity for the UHF band, and is not unable to receiver the VHF signals. Consequently, for example, if the VHF antenna 12 is removed, the antenna apparatus 1 may, for example, automatically or manually recognize the state of the removal of the VHF antenna 12, and may receive the VHF signal with the UHF antenna 13 if the TV broadcast signal corresponding to a tuned channel is the VHF signal.

The STB 3 is configured to include, for example, the 909 interface 31, a tuner 32, a front end 33, a decoder 34, an OSD circuit 35, a remote control receiving section 36, a storage section B37 and a control section 38. Each section is connected through a bus 30.

Moreover, the STB 3 is provided with, for example, a remote controller (hereinafter referred to as a remote control) 361 for the STB 3, which remote controller 361 can communicate with the remote control receiving section 36.

The 909 interface 31 is, for example, connected with the 909 interface 10 of the antenna apparatus 1, and performs the communication with the 909 interface 10 of the antenna apparatus 1 based on a predetermined standard (for example, the EIA/CEA-909 or the like) in accordance with a control signal input from the control section 38 to transmit channel information and the like to the antenna apparatus 1.

The tuner 32 is connected with the VHF antenna 12 and the UHF antenna 13 of the antenna apparatus 1, and obtains a TV broadcast signal corresponding to a channel (the channel tuned by a user) among the TV broadcast signals output from the VHF antenna 12 or the UHF antenna 13 in accordance with, for example, a control signal input from the control section 38, and outputs the obtained signal to the front end 33.

The front end 33, for example, converts a TV broadcast signal output from the tuner 32 into an intermediate frequency signal in accordance with a control signal input from the control section 38 to output the converted signal to the decoder 34.

The decoder 34, for example, performs the processing according to a predetermined file format (for example, Moving Picture Experts Group phase 2 (MPEG-2) format or the like) to a TV broadcast signal output from the front end 33 in accordance with a control signal input from the control section 38, and thereby separates the TV broadcast signal into a sound signal and an image signal to perform decoding. The decoder 34 outputs the decoded sound signal to a sound output apparatus 41, and outputs the decoded image signal to an image display apparatus 42.

The OSD circuit 35, for example, synthesizes an OSD display signal for allowing the image display apparatus 42 to perform predetermined on-screen display (OSD display) in accordance with a control signal input from the control section 38 with an image signal output from the decoder 34 to the image display apparatus 42.

The sound output apparatus 41 is, for example, a speaker equipment or the like connected to the STB 3, and outputs a sound corresponding to sound data based on a sound signal output from the decoder 34. The image display apparatus 42 is, for example, liquid crystal display equipment or the like connected to the STB 3, and displays an image corresponding to the image data based on an image signal output from the decoder 34, and an image corresponding to the image data based on an image signal that is output from the decoder 34 and is synthesized with an OSD display signal (described below) by the OSD circuit 37.

The remote control receiving section 36 receives various signals transmitted from, for example, the remote control 361, and outputs various sorts of pieces of data based on the various signals to the control section 38. The remote control 361, for example, includes a channel key and a channel up/down key, which are operated at the time of specifying a tuned channel, and transmits a signal corresponding to a user's key operation to the remote control receiving section 36.

The storage section 37 is composed of, for example, a magnetic storage medium, an optical storage medium or a semiconductor memory, and a channel map 371 and the like are stored.

For example, channel information and the like are stored in the channel map 371. To put it concretely, in the channel map 371, virtual channel numbers assigned to the channel key and the channel up/down key of the remote control 381, physical channel numbers, direction information pertaining to the directions of the directivity of the antennas, gain information pertaining to the gains of the antennas, and the like are associated with one another to be stored. The information stored in the channel map 391 is, for example, is determined in the initialization processing of the antenna system 100, and is stored in the channel map 391.

The control section 38 includes, for example, a CPU 381, a RAM 382, and a ROM 383. The CPU 381 performs various control operations in accordance with various processing programs for the STB 3, which programs are stored in the ROM 383. The RAM 382 is provided with a program storage region for expanding the processing program executed by the CPU 381 and the like, a data storage region for storing input data and the processing results produced at the time of the execution of the processing program mentioned above, and the like. The ROM 383 stores a system program executable in the STB 3, various processing programs executable in the system program, data used at the time of the execution of these various processing programs, the data of various results processed by the CPU 381, and the like. Incidentally, the programs are stored in the ROM 383 in the form of computer readable program codes. For example, the ROM 383 stores a transmission program enabling the realization of the function of transmitting channel information to the antenna apparatus 1 through the 909 interface 31.

For example, when a channel is tuned by a user's key operation of the remote control 361 or the like, the CPU 381 obtains the channel information (the physical channel number, the direction information, the gain information and the like) corresponding to the channel number (virtual channel number) of the channel from the channel map 391 of the storage section 39 to transmit the obtained channel information to the antenna apparatus 1 through the 909 interface 31 by executing the transmission program.

Moreover, the control section 38 executes the processing as the selection section to control the antenna apparatus 1 so as to select either of the UHF antenna (multidirectional antenna, first antenna) 13 and the VHF antenna (unidirectional antenna, second antenna) 12 according to the frequency of the received TV broadcast signal, the detection section to detect the reception level of the TV broadcast signal received by the UHF antenna 13 or the VHF antenna 12, and the channel setting section to set the channel of the TV broadcast signal whose reception level detected by the detection section is the predetermined value or more as a receivable channel.

Moreover, the control section 38 as the channel setting section executes the processing as the frequency band setting section capable of setting the frequency band of the TV broadcast signal within the channel is set. To put it concretely, the control section 38 is configured to be capable of setting the frequency band of the TV broadcast signal to which the channel auto scan (channel setting) is performed based on the input signal from the remote control 361 by a viewer.

The television broadcast signal receiving system 100 according to the present embodiment is configured to include the antenna apparatus 1 and the STB 3 as described above. Incidentally, the channels receivable by the antenna apparatus 10 are, for example, 1 Ch to 69 Ch, and 1 Ch to 17 Ch belong to the VHF band and 18 Ch to 69 Ch belong to the UHF band.

First Embodiment

Figure 3:
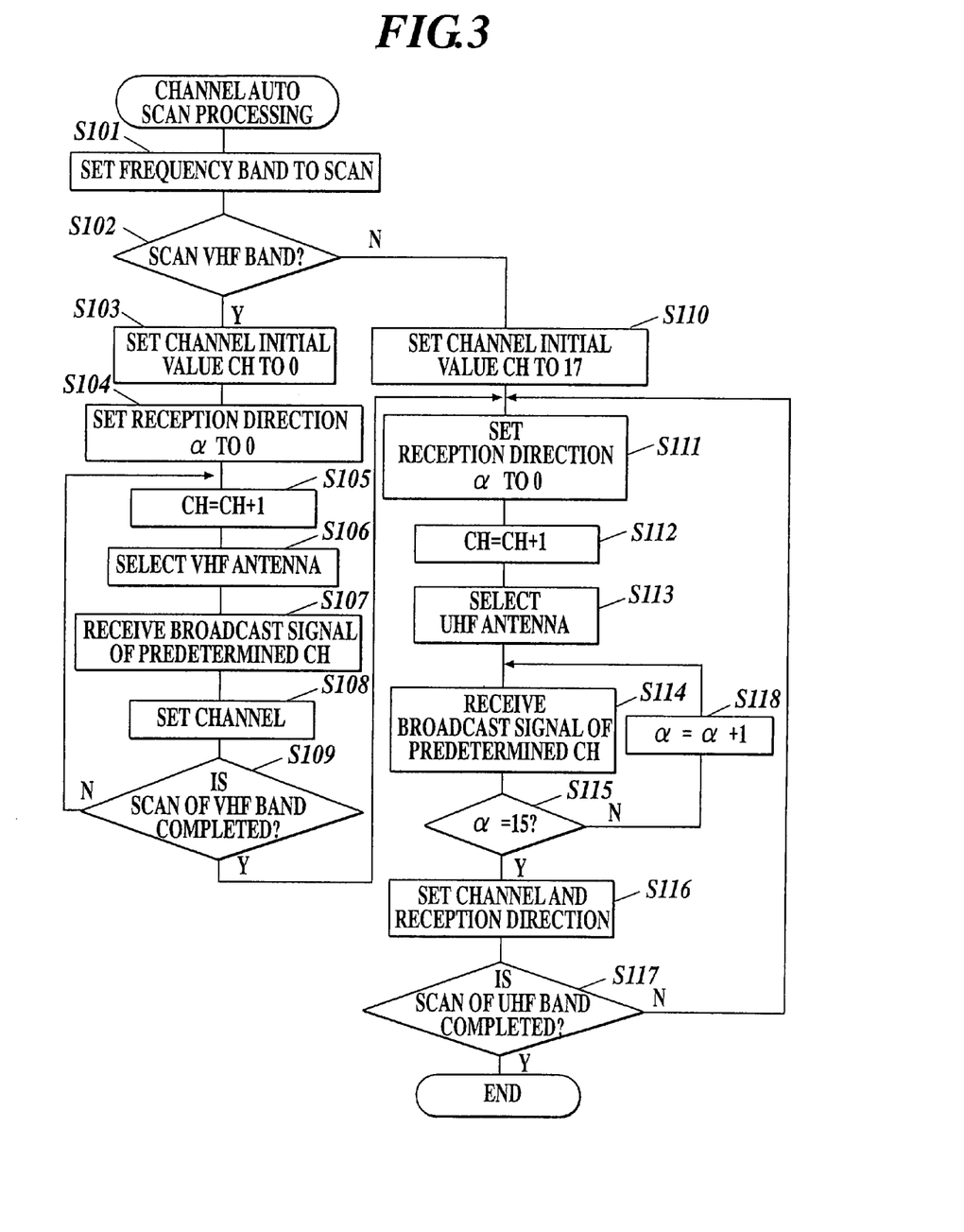
FIG. 3 is a flow chart showing the channel auto scan processing according to a first embodiment.

FIG. 3 is a flow chart showing the channel auto scan processing in the STB 3. The channel auto scan processing is performed by, for example, the execution of a predetermined program by the control section 38 based on an input operation from the remote control 361.

First, when the channel auto scan processing is started, the frequency band of the TV broadcast signal to which the channel auto scan is performed is set (Step S101). The present embodiment is configured to allow a viewer to select either of performing the channel auto scan to a TV broadcast signal (VHF signal) in the VHF band and not performing the channel auto scan.

Figure 4:
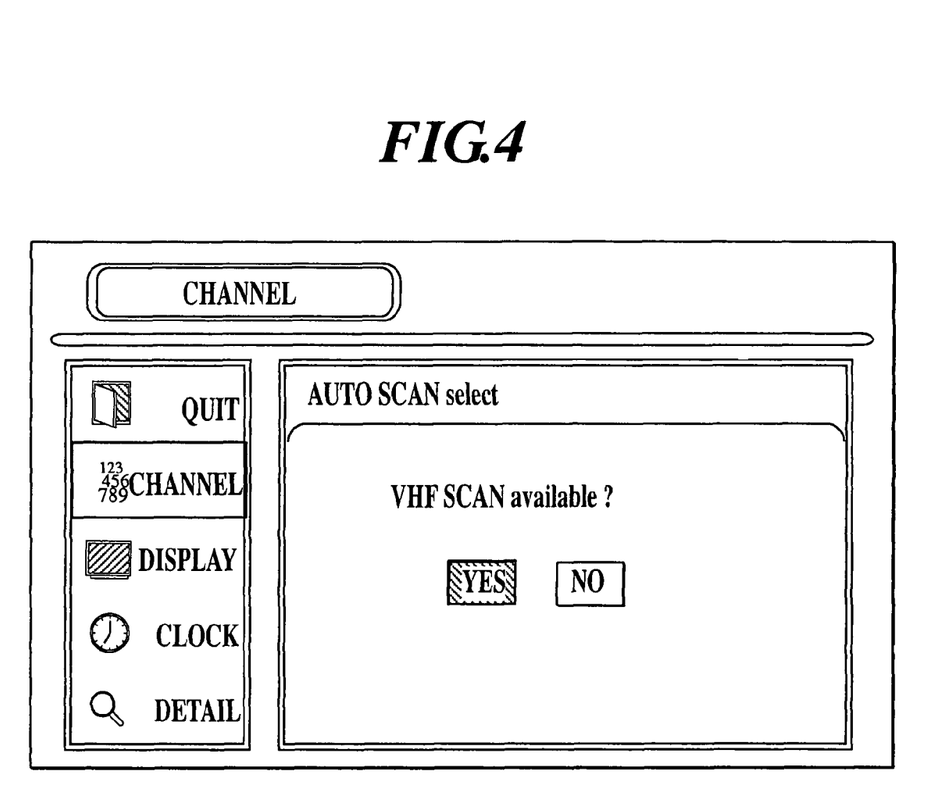
FIG. 4 shows an example of the selection screen of the channel auto scan processing according to the first embodiment.

To put it concretely, if the screen shown in FIG. 4 is displayed and "YES" is selected by an input operation from the remote control 361, the channel auto scan is performed not only to the TV broadcast signal of the UHF band but also to the TV broadcast signal of the VHF band. On the other hand, if "NO" is selected by an input operation from the remote control 361 in the screen shown in FIG. 4, the channel auto scan is performed only to the TV broadcast signal of the UHF band without performing the channel auto scan to the TV broadcast signal of the VHF band.

Next, at Step S102, if it is judged to perform the channel auto scan to the TV broadcast signal of the VHF band, then the processing shifts to Step S103, and the channel auto scan is first started to the TV broadcast signal of the VHF band.

In the channel auto scan to the TV broadcast signal of the VHF band, the channel is first initialized at Step S103, and the reception direction is initialized at Step S104.

For example, a channel number CH is set to 0, and a reception direction α is set to 0. Incidentally, because the reception direction is a single direction to the TV broadcast signal of the VHF band, the reception direction does not change. The reception direction α is set to 0 for convenience.

Next, one (1) is added to the channel number at Step S105. That is, the channel number becomes: CH=1.

Next, the VHF antenna (unidirectional antenna, second antenna) 12 is selected as the reception antenna (selection section) at Step S106.

A TV broadcast signal corresponding to a predetermined channel is then received at Step S107. Next, if a reception level of the TV broadcast signal of the channel is equal to the predetermined level or more, the channel is set as a receivable channel at Step S108 (detection section, channel setting section).

The channel setting to one TV broadcast signal of the VHF band ends by the above processing.

Next, it is judged whether all channel settings have been completed or not, that is whether CH is 17 or not, as for the channels corresponding to the TV broadcast signals of the VHF band (for example, 1 Ch to 17 Ch) at Step S109. If it is then judged that CH is not 17, the processing shifts to Step S105. One (1) is added to the channel number, and channel setting is performed to the next channel.

On the other hand, if it is judged that CH is 17 at the Step S109, the channel auto scan of the TV broadcast signals of the VHF band is completed. The processing shifts to that at Step S111, and the channel auto scan is started to the TV broadcast signals of the UHF band.

Moreover, if it is judged that the channel auto scan to the TV broadcast signals of the VHF band is not performed at the Step S102, the processing shifts to that at Step S110 to initialize the channel (for example, setting the channel number CH: CH=17). After that, the processing shifts to that at Step S111, and the channel auto scan is started to the TV broadcast signals of the UHF band.

In the channel auto scan to the TV broadcast signals of the UHF band, the reception direction is first initialized at the Step S111. For example, the reception direction α is set to 0. Incidentally, because the reception direction of the UHF antenna 13 is changed into 16 directions to the TV broadcast signals of the UHF band, the reception direction α takes the values of 0-15.

Next, one (1) is added to the channel number at Step S112. That is, because the channel number CH is 17 at the time point when the channel auto scan to the TV broadcast signals of the VHF band has completed, or at the time point when the channel is initialized at the Step S110, the addition of one (1) to the channel number results in CH=18. Next, the UHF antenna (multidirectional antenna, first antenna) 13 is selected as the reception antenna at Step S113 (selection section).

A TV broadcast signal corresponding to a predetermined channel is then received at Step S114. Next, it is judged whether the reception processing has been performed into 16 directions or not, namely whether the reception direction α is 15 or not, at Step S115. If it is judged that the reception direction α is not 15 at the Step S115, one (1) is added to the reception direction α at Step S118, and the processing at and after the Step S114 is executed (reception direction switch section).

If it is then judged that the reception direction α is 15 at the Step S115, the processing shifts to that at Step S116. Next, if the reception level of the TV broadcast signal at the channel which is the predetermined value or more is obtained at Step S116, the channel is set as the receivable channel (detection section, channel setting section). At the same time, the reception direction in which the optimum reception state can be obtained is set based on the reception levels to a plurality of reception direction detected at the time of sequential changing of the reception directions (α=0-15) (reception direction setting section).

By the processing mentioned above, the channel setting of one TV broadcast signal of the UHF band ends.

Next, it is judged whether all of the channel settings to the channels (for example, 18 Ch to 69 Ch) corresponding to the TV broadcast signals of the UHF band have been completed or not, namely whether the channel number CH has become 69 or not, at Step S117. If it is then judged that the channel number CH is not 69, the processing shifts to that at Step S111. The reception direction is initialized, and one (1) is added to the channel number at the Step S112 to set the channel in the next channel.

On the other hand, if it is judged that the channel number CH is 69 at the Step S117, then the channel auto scan of the TV broadcast signals of the UHF band has been completed, and the channel auto scan processing ends at that time.

As described above, because the first embodiment allows a viewer to select whether to perform the channel auto scan to the TV broadcast signals of the VHF band or not, the viewer can allow the television broadcast signal receiving system 100 to execute the channel auto scan processing only to the broadcast signals of the desired frequency band.

For example, as the television broadcast becomes digitalized, the TV broadcast signals of the VHF band has the tendency of decreasing. A viewer can feel that it is unnecessary to receive the TV broadcast signals of the VHF band. In such a case, the time of auto scan can be remarkably shortened by setting the television broadcast signal receiving system 100 not to perform the channel auto scan of the TV broadcast signals of the VHF band.

Second Embodiment

Figure 5:
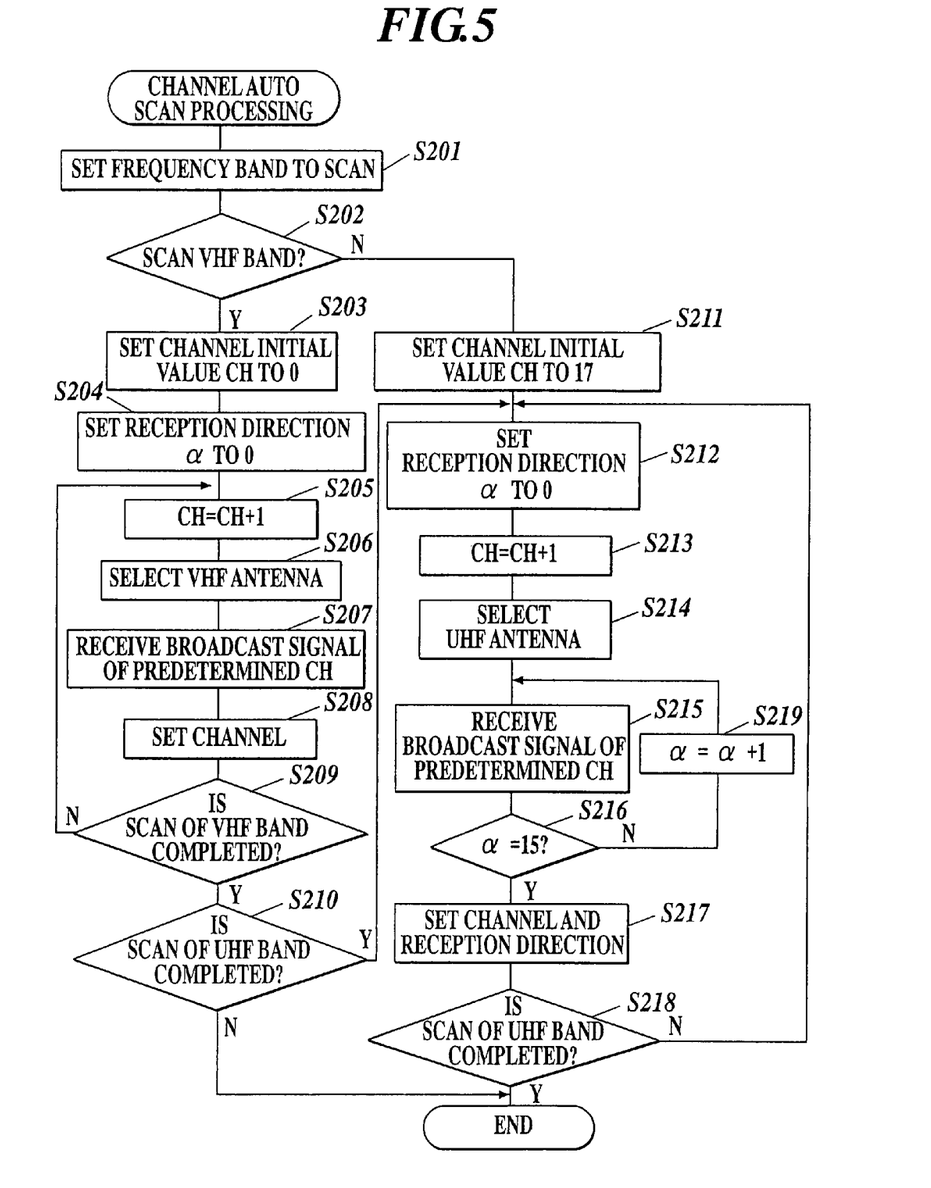
FIG. 5 is a flow chart showing the channel auto scan processing according to a second embodiment.

FIG. 5 is a flow chart showing the channel auto scan processing in the STB 3. The channel auto scan processing is performed by the execution of a predetermined program by the control section 38 based on, for example, an input operation from the remote control 361.

The processing of FIG. 5 differs from that of the flow chart of FIG. 3 showing the channel auto scan processing of the first embodiment in the respect of providing the processing at Step S210. That is, a viewer can select whether or not to perform the channel auto scan of the TV broadcast signals of the UHF band or not in the second embodiment.

First, when the channel auto scan processing is started, the frequency band of the TV broadcast signals within the channel is set (the frequency band to be scanned) is set (Step S201). The present embodiment allows a viewer to select the frequency band to which the channel auto scan is performed from the items of performing the channel auto scan to the sole UHF band, the sole VHF band, and both the UHF and the VHF band.

Figure 6:
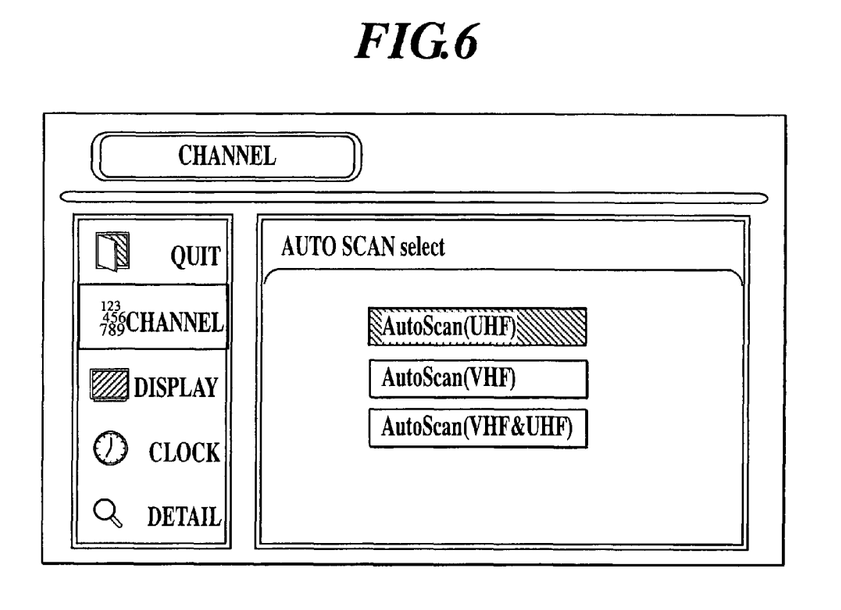
FIG. 6 shows an example of the selection screen of the channel auto scan processing according to the second embodiment.

To put it concretely, the screen shown in FIG. 6 is displayed. If the icon "Auto Scan (UHF)" is selected by an input operation from the remote control 361, the channel auto scan is performed only to the TV broadcast signals of the UHF band. On the other hand, if the icon "Auto Scan (VHF)" is selected in the screen shown in FIG. 6 by the input operation from the remote control 361, the channel auto scan is performed only to the TV broadcast signals of the VHF band. Moreover, if the icon "Auto Scan (VHF & UHF)" is selected in the screen shown in FIG. 6 by an input operation of the remote control 361, the channel auto scan is performed to the TV broadcast signals of both of the VHF band and the UHF band.

That is, if the icon "Auto Scan (UHF)" is selected in FIG. 6, it is judged that the channel auto scan is not performed to the TV broadcast signals of the VHF band at Step S202 in FIG. 5. The processing then shifts to that at Step S211, and performs the channel auto scan to the TV broadcast signals of the UHF band. Incidentally, because the channel auto scan to the TV broadcast signals of the UHF band shown in FIG. 5 (Steps S211-S219) is the same as the channel auto scan to the TV broadcast signals of the UHF band shown in FIG. 3 (Steps S110-S118), the description of the processing is omitted. If it is then judged that the channel auto scan to the TV broadcast signals of the UHF band has been completed at Step S218, the channel auto scan processing ends.

Moreover, if the icon "Auto Scan (VHF)" is selected in FIG. 6, it is judged that the channel auto scan is performed to the TV broadcast signals of the VHF band at Step S202 in FIG. 5. The processing then shifts to that at Step S203, and performs the channel auto scan to the TV broadcast signals of the VHF band. Incidentally, because the channel auto scan to the TV broadcast signals of the VHF band shown in FIG. 5 (Steps S203-S209) is the same as the channel auto scan to the TV broadcast signals of the VHF band shown in FIG. 3 (Steps S103-S109), the description of the processing is omitted. If it is then judged that the channel auto scan to the TV broadcast signals of the VHF band has been completed at Step S209, the processing shifts to that at the Step S210, and judges whether to execute the channel auto scan to the TV broadcast signals of the UHF band or not. If the icon "Auto Scan (VHF)" is selected in FIG. 6, it is judged that the channel auto scan to the TV broadcast signals of the UHF band is not performed at Step S210. Consequently, the channel auto scan processing ends as it is.

Moreover, if the icon "Auto Scan (UHF & VHF)" is selected in FIG. 6, it is judged that the channel auto scan is performed to the TV broadcast signals of the VHF band at Step S202 in FIG. 5. The processing then shifts to that at Step S203, and performs the channel auto scan to the TV broadcast signals of the VHF band. If it is then judged that the channel auto scan to the TV broadcast signals of the VHF band has been completed at Step S209, the processing shifts to that at the Step S210, and judges whether to execute the channel auto scan to the TV broadcast signals of the UHF band or not. If the icon "Auto Scan (UHF & VHF)" is selected in FIG. 6, it is judged that the channel auto scan to the TV broadcast signals of the UHF band is performed at Step S210. Consequently, the processing shifts to that at Step S212, and performs the channel auto scan to the TV broadcast signals of the UHF band. If it is then judged that the channel auto scan to the TV broadcast signals of the UHF band has been completed, the channel auto scan processing ends.

As described above, because the second embodiment allow the viewer to select the frequency band in which the channel auto scan is performed among the items of performing the channel auto scan only in the UHF band, only in the VHF band, or in both of the UHF band and the VHF band, the viewer can allow the television broadcast signal receiving system 100 to execute the channel auto scan processing only to the broadcast signals of the desired frequency band.

For example, as the television broadcast has been digitalized, the broadcast signals of the VHF band is in the tendency of decreasing, and some viewers can feel that it is unnecessary to receive the broadcast signals of the VHF band. In such a case, the auto scan time can be remarkably shortened by setting not to execute the channel auto scan to the broadcast signals of the VHF band.

Moreover, the first and the second embodiments described above, to the TV broadcast signals of the UHF band, set the channels and the reception directions ($\alpha$=0-15) of the TV broadcast signals (18 Ch to 69 Ch) of the UHF band based on the reception levels of the reception signals obtained at the time of selecting the UHF antenna 13. On the other hand, the first and the second embodiments, to the TV broadcast signals of the VHF band, set only the channels of the TV broadcast signals (1 Ch to 17 Ch) of the VHF band based on the reception levels of the reception signals obtained at the time of selecting the VHF antenna 12. That is, the first and the second embodiments further simplify the channel auto scan by setting the reception directions of the TV broadcast signals of the VHF band, which will be abolished in future, to one direction regulated by the unidirectional VHF antenna 12.

Incidentally, the number of the broadcasting stations using the TV broadcast signals of the VHF band has been decreasing every year, and only several stations are left now. It is conceivable that the dealing of the setting of the channels of the VHF broadcast signals can be sufficiently performed by the hands of a viewer.

Although the invention devised by the inventor of the present invention has been concretely described based on the preferred embodiments above, the present invention is not limited to the embodiments, but can be changed without departing the sprit and the scope thereof.

Although the above embodiments set 1 Ch to 17 Ch as the broadcast signals of the VHF band (second frequency band) and 18 Ch to 69 Ch as the broadcast signals of the UHF band (first frequency band), the boundary between the first frequency band and the second frequency band may be set by a viewer. For example, if the auto scan to the TV broadcast signals of the VHF band is set not to be performed in case of setting 1 Ch to 20 Ch as the VHF band, the time necessary for the channel auto scan processing is further shortened. Moreover, it is also possible to lower the upper limit of the first frequency band (UHF band) (for example, setting of the physical channels of the first frequency band to 18 Ch to 65 Ch), or to raise the lower limit of the second frequency band (VHF band) (for example, setting the physical channels of the second frequency band to 5 Ch to 17 Ch).

Figure 7:
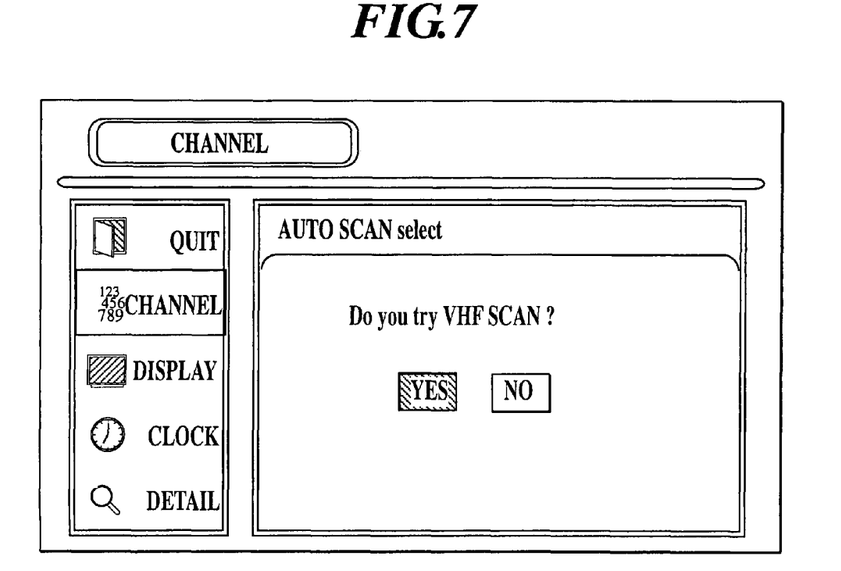
FIG. 7 shows another example of the selection screen of the channel auto scan processing according to the first embodiment.

Moreover, although the above first embodiment allows the viewer to select whether to perform the channel auto scan to the TV broadcast signals of the VHF band or not at the time point of starting the channel auto scan processing, the configuration of allowing the viewer to perform the selection of whether to perform the channel auto scan to the TV broadcast signals of the VHF band or not after the completion of the channel auto scan to the TV broadcast signals of the UHF band may be adopted. For example, by the configuration, after the completion of the auto scan to the TV broadcast signals of the UHF band, the screen shown in FIG. 7 is displayed, and the viewer is allowed to input an operation in the screen.

Moreover, although the above embodiments have been described about the channel auto scan processing using the antenna apparatus 1 provided with the VHF antenna 12 and the UHF antenna 13, the configuration of the antenna apparatus 1 is not limited to such one, but, for example, the configuration using the so-called smart antenna disclosed in Japanese Patent Application Publication Laid-open No. 2001-036327 may be adopted as the antenna apparatus 1. However, if the antenna apparatus 1 using a multidirectional antenna also for the VHF band is used, the processing similar to the channel auto scan processing to the TV broadcast signal of the UHF band is also executed to the TV broadcast signals of the VHF band differently from the channel auto scan processing shown in FIGS. 3 and 5.

The entire disclosure of Japanese Patent Application No. 2006-103941 filed on Apr. 5, 2006, including description, claims, drawings and summary are incorporated herein by reference in its entirety.

What is claimed is:

1. A television broadcast signal receiving apparatus connected to an antenna apparatus including a first antenna capable of receiving a broadcast signal of a UHF band from a plurality of directions, and a second antenna capable of receiving a broadcast signal of a VHF band from a single direction wherein a directivity is changeable by a manual operation, the television broadcast signal receiving apparatus comprising:

a selection section to select any one of the first antenna and the second antenna according to a frequency of a broadcast signal to be received;

a detection section to detect a reception level of the broadcast signal received by the first antenna or the second antenna;

a channel setting section to set, when the detected reception level of the received broadcast signal is a predetermined level or more, a channel of the received broadcast signal as a receivable channel, thereby performing channel auto scan, the reception level being detected by the detection section;

a control section to control operations of the selection section, the detection section and the channel setting section; and an operation section to enable a viewer to input an operation, wherein the channel setting section includes:

a reception direction switch section to switch reception directions of the first antenna;

a reception direction setting section to set a reception direction in which a reception state is optimum based on the reception levels in the reception directions detected by the detection section when the reception direction switch section sequentially switches the reception directions of the first antenna; and a frequency band setting section to allow the viewer to decide whether or not to set the VHF band as a channel-auto-scan frequency band, a broadcast signal of which is subjected to the channel auto scan, wherein the frequency band setting section sets either of only the UHF band or both the UHF band and the VHF band as the channel-auto-scan frequency band based on an input signal from the operation section, the input signal corresponding to the operation input by the viewer, the control section, in accordance with the channel-auto-scan frequency band set by the frequency band setting section, allows the selection section to select the first antenna for the broadcast signal of the UHF band and allows the channel setting section to set the channel and the reception direction of the broadcast signal of the UHF band, and allows the selection section to select the second antenna for the broadcast signal of the VHF band and allows the channel setting section to set the channel of the broadcast signal of the VHF band.

2. A television broadcast signal receiving apparatus connected to an antenna apparatus including a first antenna capable of receiving a broadcast signal of a UHF band, and a second antenna capable of receiving a broadcast signal of a VHF band, the television broadcast signal receiving apparatus comprising:

a selection section to select any one of the first antenna and the second antenna according to a frequency of a broadcast signal to be received;

a detection section to detect a reception level of the broadcast signal received by the first antenna or the second antenna;

a channel setting section to set, when the reception level of the received broadcast signal is a predetermined level or more, a channel of the received broadcast signal as a receivable channel, thereby performing channel auto scan, the reception level being detected by the detection section;

a control section to control operations of the selection section, the detection section and the channel setting section; and an operation section to enable a viewer to input an operation, wherein the channel setting section includes a frequency band setting section to set a channel-auto-scan frequency band, a broadcast signal of which is subjected to the channel auto scan, the frequency band setting section sets the channel-auto-scan frequency band based on an input signal from the operation section, the input signal corresponding to the operation input by the viewer, and the control section, in accordance with the channel-auto-scan frequency band set by the frequency band setting section, allows the selection section to select the first antenna for the broadcast signal of the UHF band and to select the second antenna for the broadcast signal of the VHF band.

3. The television broadcast signal receiving apparatus according to claim 2, wherein the frequency band setting section allows the viewer to decide whether or not to set the VHF band as the channel-auto-scan frequency band.

4. The television broadcast signal receiving apparatus according to claim 3, wherein the frequency band setting section allows the viewer to decide whether or not to set the VHF band as the channel-auto-scan frequency band after the channel setting section performs the channel auto scan on the broadcast signal of the UHF band.

5. The television broadcast signal receiving apparatus according to claim 2, wherein the frequency band setting section sets either or both of the UHF band and the VHF band as the channel-auto-scan frequency band.

6. The television broadcast signal receiving apparatus according to claim 2, wherein the first antenna is a multidirectional antenna capable of switching reception directions, and the second antenna is a unidirectional antenna capable of receiving the broadcast signal from a single direction;

the channel setting section includes:

a reception direction switch section to switch the reception directions of the first antenna; and a reception direction setting section to set a reception direction in which a reception state is optimum based on the reception levels in the reception directions detected by the detection section when the reception direction switch section sequentially switches the reception directions of the first antenna, and the control section allows the selection section to select the first antenna for the broadcast signal of the UHF band and allows the channel setting section to set the channel and the reception direction of the broadcast signal of the UHF band,
and allows the selection section to select the second antenna for the broadcast signal of the VHF band and allows the channel setting section to set the channel of the broadcast signal of the VHF band.

* * * * *